(12) United States Patent (10) Patent No.: US 7,898,310 B2
Qui et al. (45) Date of Patent: Mar. 1, 2011

(54) PHASE DOUBLER

(75) Inventors: Weihong Qui, San Jose, CA (US); Chun Cheung, Brooklyn, NY (US); Emil Chen, Hillsborough, NJ (US); Paul Sferrazza, Fleminton, NJ (US); Robert Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/429,238

(22) Filed: Apr. 24, 2009

(65) Prior Publication Data

US 2010/0079175 A1    Apr. 1, 2010

Related U.S. Application Data

(60) Provisional application No. 61/101,377, filed on Sep. 30, 2008, provisional application No. 61/105,917, filed on Oct. 16, 2008.

(51) Int. Cl.
*H03K 3/00* (2006.01)
(52) U.S. Cl. ...................... 327/231; 327/176
(58) Field of Classification Search ................ None
See application file for complete search history.

(56) References Cited

U.S. PATENT DOCUMENTS

2007/0200607 A1* 8/2007 Ohshima et al. ............ 327/256
2009/0140787 A1* 6/2009 Shiratsuchi et al. ......... 327/254
2010/0073060 A1* 3/2010 Nguyen ..................... 327/255

* cited by examiner

*Primary Examiner* — Lincoln Donovan
*Assistant Examiner* — Sibin Chen
(74) *Attorney, Agent, or Firm* — Howison & Arnott, L.L.P.

(57) ABSTRACT

A phase doubler driver circuit includes first control logic generates a first output PWM drive signal and a second output PWM drive signal responsive to an input PWM drive signal. In a first mode of operation, alternating pulses of the input PWM drive are output as the first output PWM drive signal and the second PWM output drive signal respectively. In a second mode of operation, the input PWM drive signal is provided as the first output PWM drive signal when a second phase current associated with the second output PWM drive signal exceeds a first phase current associated with the first output PWM drive signal and the input PWM drive signal is provided as the second output PWM drive signal when the phase current associated with the first output PWM signal exceed the phase current associated with the second output PWM signal. Second control logic adds an offset to a falling edge of the first output PWM drive signal responsive to a difference between a first current associated with the first phase current and an average current and for adding the offset to a falling edge of the second output PWM signal responsive to a difference between a second current associated with the second phase current.

19 Claims, 10 Drawing Sheets

▨▨▨ INCOMING PWM (ORIGINAL SIGNAL)
    OUTPUT PWM SIGNAL

PHASE DOUBLER

CROSS-REFERENCE TO RELATED APPLICATIONS

This application claims the benefit of U.S. Provisional Application for Patent Ser. No. 61/101,377, filed Sep. 30, 2008, and entitled PHASE SWAPPER SCHEME FOR IMPROVED PHASE CURRENT BALANCE IN PHASE DOUBLER and of U.S. Provisional Application for Patent Ser. No. 61/105,917, filed Oct. 16, 2008, and entitled TECHNIQUE FOR GENERATING TWO CURRENT BALANCED PHASES FROM A SINGLE PWM, the specifications of which are incorporated herein in their entireties.

BRIEF DESCRIPTION OF THE DRAWINGS

For a more complete understanding, reference is now made to the following description taken in conjunction with the accompanying Drawings in which.

DETAILED DESCRIPTION

Figure 1:
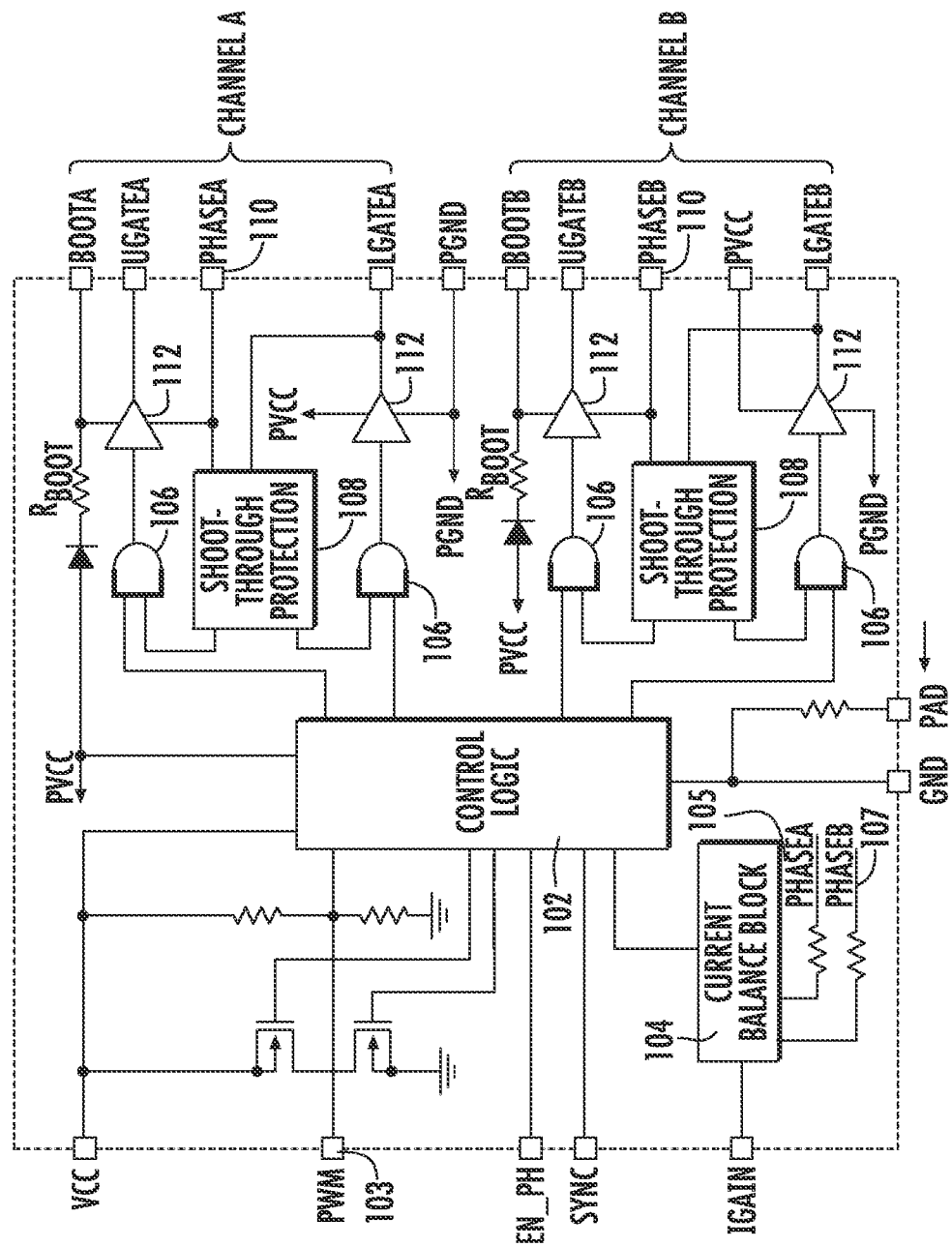
FIG. 1 illustrates a block diagram of a phase doubler driver.

Referring now to the drawings, wherein like reference numbers are used herein to designate like elements throughout, the various views and embodiments of a phase doubler driver are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A phase doubler circuit enables a circuit designer to increase the phase count of a multiphase system using current generation controllers. Thus, a single PWM signal may be used to generate a pair of PWM output signals from the single PWM input. The higher number of output phases provides a number of benefits including better efficiencies at high load currents and the ability to use cheaper components within circuit designs because each channel will now handle less current. One current technique for providing phase doubling involves placing two power trains on the same upper gate and lower gate control signals. Thus, within a pair of voltage regulation circuits having an upper gate and lower gate switching power transistors, the first PWM drive signal (comprising a PWM signal in phase with a PWM signal received from the PWM controller) is applied to the upper gates of each of the pair of voltage regulation circuits, and a second PWM signal (comprising a PWM signal which is the inverse of the PWM signal received from the PWM controller) is applied to the lower gates of each of the voltage regulation circuits. However, this provides a number of drawbacks. Mismatches, due to a variety of factors, can cause major current imbalances even for PWM signals of similar pulse size. Additionally, efficiency losses are a problem because the two channels are in phase with each other.

Referring now to the drawings, and more particularly to FIG. 1, there is illustrated a block diagram of a phase doubler driver circuit. A PWM input signal is provided to the control logic 102 via an input pin 103. A current balance block 104 also provides control signals to control logic 102, the current balance block 104 monitors the phase current on each of the channel A and channel B via a phase A input 105 and a phase B input 107. The control logic 102 generates gate control signals to the upper and lower gates of the channel A circuit and the channel B circuit. Outputs are provided from the control logic 102 to four separate AND gates 106. Each of the AND gates 106 are associated with one of the upper gate or lower gate of voltage regulators on each of channel A and channel B.

The second inputs of the AND gates 106 are provided from shoot-through protection logic 108. The shoot-through protection logic 108 monitors the phase current on channel A and channel B via input pins 110, and is used to disable the outputs of the upper and lower gate drive signals during shoot-through conditions. The outputs of AND gates 106 are provided to the inputs of driver circuits 112. The outputs of the driver circuits 112 are connected with gate output pins 130-133 of the phase doubler driver circuit, respectively. The gate 130 and gate 131 outputs on channel A of the phase doubler driver are used for driving the upper and lower gates of a channel A voltage regulator, as will be more fully illustrated hereinbelow. Similarly, the gate 132 and gate 133 outputs of the phase doubler driver are used for driving the upper and lower gates of a voltage regulator on channel B.

Figure 2:
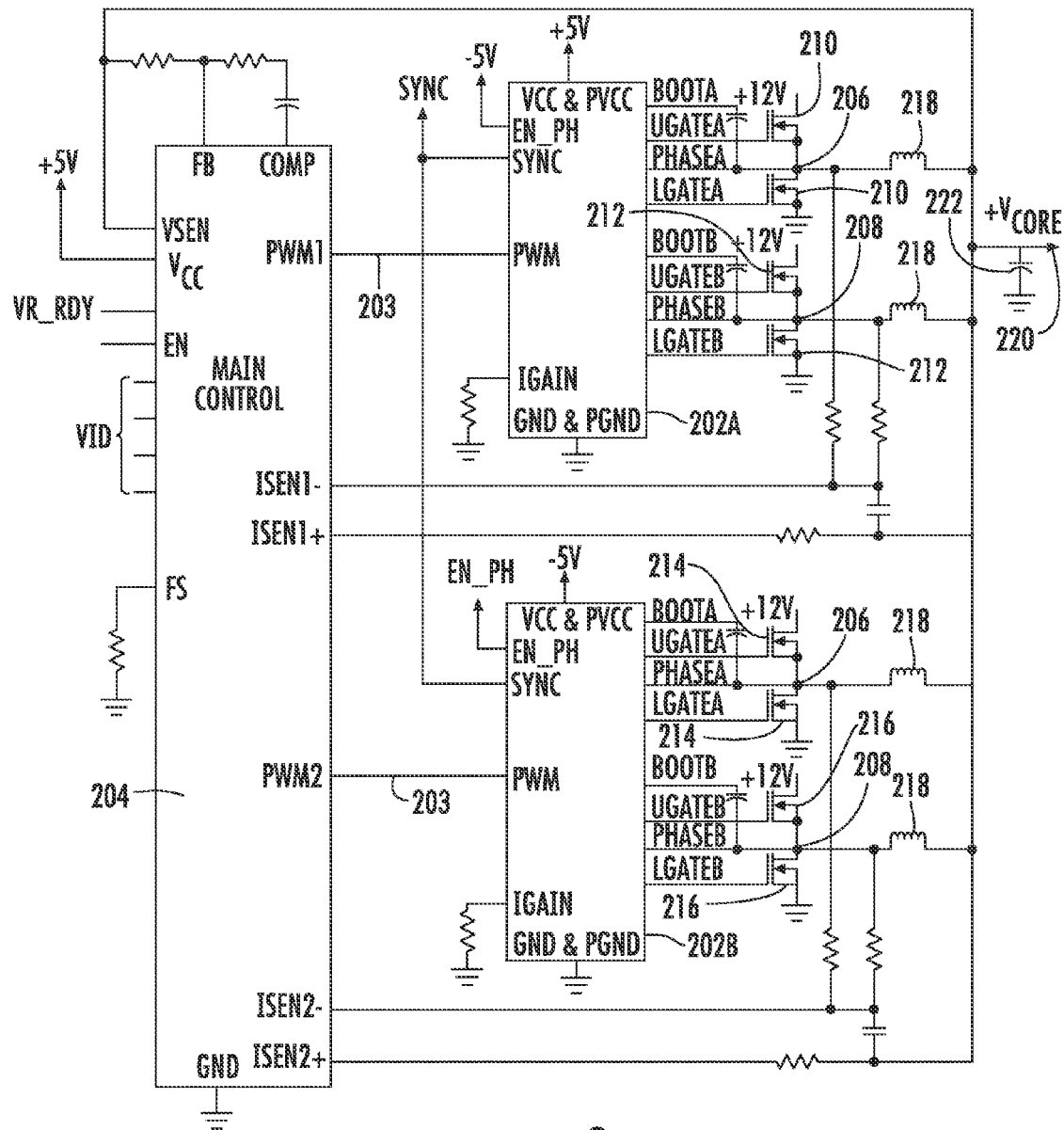
FIG. 2 illustrates a block diagram showing the application of a pair of phase doubler drivers within a voltage regulation circuit.

Referring now to FIG. 2, there is illustrated the implementation of a phase doubler driver 202 within a voltage regulation circuit, including a pair of voltage regulators on two separate channels. The phase doubler driver 202 are configured to receive an input PWM control signal via inputs 203 from a main control block 204. The main control block 204 senses the output at phase nodes 206 associated with channel A of each phase doubler driver 202 and at phase node 208 associated with channel B of each phase doubler driver 202. The PWM signals applied to each of the phase doubler drivers 202 are used to generate upper and lower gate control signals to upper and lower power switching transistors of each of the four voltage regulator circuitries. The channel A gate control signals from voltage phase doubler driver 202A are applied to transistors 210 while the gate control signals for channel B are applied to transistors 212. Similarly, the gate control signals to channel A for phase doubler driver 202B are applied to transistors 214, and the gate drive signals associated with channel B are applied to transistors 216 associated with channel B. Each of the four voltage regulation circuits connected to the phase doubler drivers 202 include an inductor 218 connected between nodes 206 and 208, and the output voltage node 220. A capacitor 222 is connected between the output voltage node 220 and ground.

FIG. 2 illustrates the use of the phase doubler with a conventional current balance scheme. A conventional current balance scheme can keep the phase current at each of the phase nodes 206 and 208 close to each other under steady state conditions. By sensing the phase current at each phase node 206 and 208, the duty cycle PWM of each phase may be adjusted according to the error between the phase current and the average phase current. However, the circuitry may have difficulties maintaining a good phase current balance under high frequency transient events. Conventional phase balancing schemes will adjust the duty cycle of the phase PWM pulse to maintain the phase current balance. In order to avoid the impact on voltage regulation, the current balance loop gain and bandwidth are limited. Thus, the phase current balance is not improved under high frequency transient events.

Figure 3:
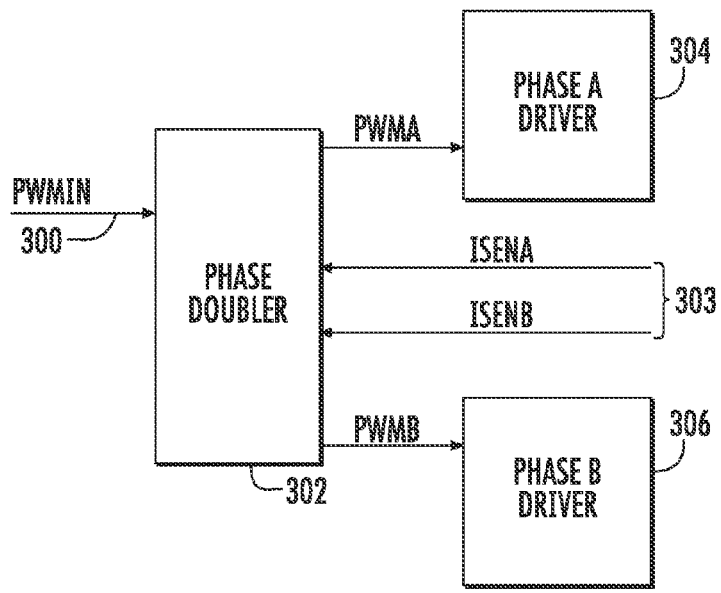
FIG. 3 illustrates is a simplified block diagram of a phase doubler driver.

Referring now to FIG. 3, there is illustrated a simplified control block diagram of a phase doubler circuit. A PWM input signal 300 is applied to the phase doubler circuit 302 from a main control block 204 as illustrated in FIG. 2. The phase doubler circuit 302 also receives monitored phase currents from channel A and channel B via inputs 303. Based upon the sensed current ISENA and ISENB from each of the associated phase nodes on inputs 303, the phase doubler circuit 302 generates PWM control signals PWMA and PWMB to phase A driver 304 and phase B driver 306, respectively.

Figure 4:
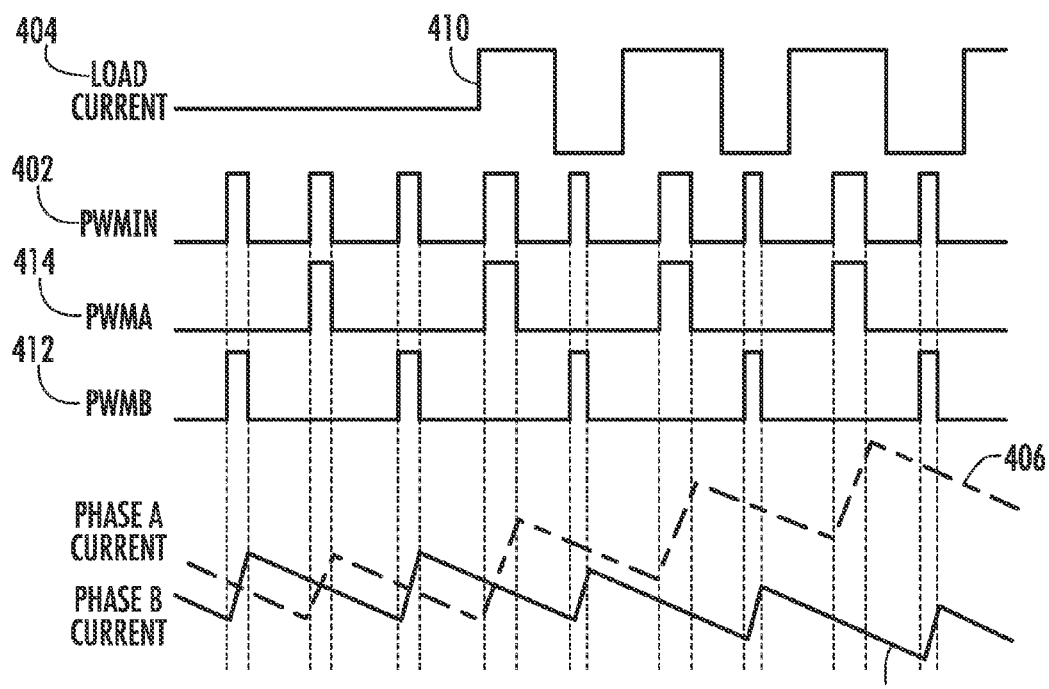
FIG. 4 illustrates the operational wave forms of a phase doubler driver not using a phase swapping scheme.

Referring now to FIG. 4, there are illustrated the operational wave forms of a phase doubler that does not include a phase swapping functionality as described hereinbelow. The duty cycle of the input PWM signal 402 may be varied based upon the instanteous load current 404. When the load current 404 is changing at a very high rate that is close to the switching frequency of the phase current, the phase current may be far away from the average current resulting in a severe phase current imbalance between the phase A current and the phase B current. When a load current is switching at a rate close to the switching frequency, only one side (A or B) will be exposed to heavy loading. That is, the higher load current requirement will always occur on the same phase. As a result, one phase will be conducting significantly more current and the opposite phase will begin to conduct less current. This is illustrated with respect to the phase A current, represented by line 406, and the phase B current, represented by line 408. When the load current 404 begins switching at point 410, the difference between the phase A current 406 and the phase B current 408 begins to drastically increase. The controller cannot improve the phase current balance since it only controls the total current. In a phase doubler not including a phase swapping functionality, the input PWM signal 402 is merely switched between a B channel as a PWM B signal 412 and an A channel as a PWM A signal 414. Thus, the PWM pulses of the PWM signal 402 are merely alternated between the PWM B signal 412 and the PWM A signal 414.

Figure 5:
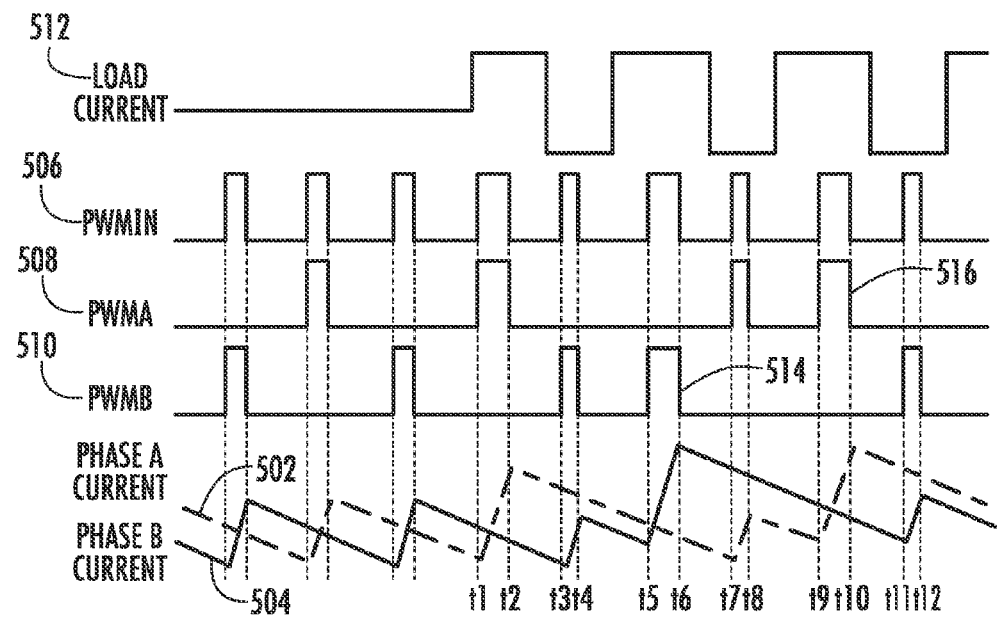
FIG. 5 illustrates the operational wave forms of a phase doubler driver using a phase swapping scheme.

Referring now also to FIG. 5, a phase doubler controller utilizing a phase swapping functionality may provide the operational wave forms as illustrated in FIG. 5. By monitoring the channel A phase current 502 and the channel B phase current 504, the phase doubler controller may implement a phase swapping scheme that will send a PWM pulse from the PWM input signal 506 to either the PWM A signal 508 for channel A or the PWM signal B 510 for channel B. The selected channel is based upon which phase has a smaller phase current at a particular point in time, rather than selecting the phases in an alternating order. Thus, when the load current 512 begins changing at a rate close to the switching frequency, the differences between the phase A current 502 and phase B current 504 will not drastically increase when using a phase swapping scheme.

For example, as shown in FIG. 5, the phase B current 504 is less than the phase A current 502 at time $T_5$ due to the step load. Utilizing the phase swapping scheme, phase B signal 510 will again be turned on at time $T_5$ to provide an additional PWM pulse 514 to push the phase B current 504 closer to the average current rather than providing the PWM pulse to channel A. Similarly, at time $T_9$, the phase A current 502 is again turned on by applying a second PWM pulse 516 via the PWMA signal 508. This prevents the phase A current 502 from dropping to too low a level. Comparing the phase current A 406 and the phase current B 408 in FIG. 4 with the phase current A 502 and the phase current B 504 in FIG. 5, it can be seen that the phase current difference is significantly improved by the phase swapping scheme.

Figure 6:
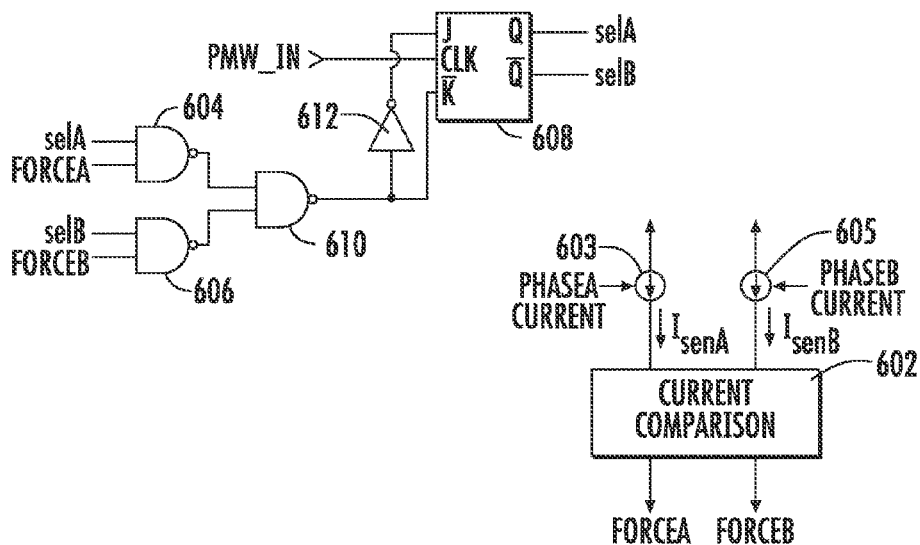
FIG. 6 is a simplified block diagram of an implementation of a phase swapping circuit for use with in a phase doubler driver.

Referring now to FIG. 6, there is illustrated a simplified block diagram of a circuit for implementing a phase swapping scheme within a phase doubler controller circuit according to the present disclosure. A current comparison circuit 602 receives the phase A current at a current source 603 to generate an $I_{SENA}$ current and uses the phase B current at a current source 605 to generate an $I_{SENB}$ sensed current within the current comparator 602. If the $I_{SENA}$ current is greater than the $I_{SENB}$ current, the force B output of the current comparator 602 is driven to a logical high level. If the $I_{SENB}$ current is greater than the $I_{SENA}$ current, the force A output is driven to a logical "high" level depending on which phase current is lower. The current comparator 602 monitors the sensed currents generated responsive to the monitored phase currents and forces the force A or force B signal to a logical high level. The phase that is carrying less current will have its force signal sent high. The force A output and the force B output are provided to the inputs of NAND gates 604 and 606, respectively. Provided to the second input of NAND gate 604 are SELA channel control signal and provided to NAND gate 606 are SELB channel signal. The SELA and SELB control signals are provided from the Q and $\overline{Q}$ outputs of a JK flip-flop 608.

The outputs of NAND gates 604 and 606 are provided to the inputs of a third NAND gate 610. The output of NAND gate 610 is applied to the input of an inverter 612 and to the $\overline{k}$ input of the JK flip-flop 608. The output of the inverter 612 is provided to the J input of the JK flip-flop 608. The PWM signal PWM_in is provided to the clock input of the JK flip-flop 608. The JK flip-flop 608 controls which phase the incoming PWM clock signal pulse is provided to. The outputs of the JK flip-flop 608 comprise opposite polarity digital channels SELA and SELB, respectively. These signals are used to select which phase to send the PWM signal to.

Under well-balanced conditions, the JK flip-flop 608 will toggle back and forth between SELA=1 and SELB=1. If a substantial mismatching current level between the phase A current and the phase B current occurs due to a load transient, the phase current for the phase A or phase B current will need to fire two or more times in a row in order to catch the phase current of one phase up with the phase current of the other phase. In this case, the flip-flop 608 will not toggle between A and B, but would maintain the current select signal at the logical high level for the next PWM pulse for the phase current that is too low. For example, if the phase A current just finished firing, but still has less current than phase B, the force A signal would remain high. Additionally, the SELA would remain high, causing the J input to be a logical low level and the k input to a logical high level forcing the JK flip-flop 608 to hold a previous state. The SELA signal would remain at a logical high level and the SELB signal would remain at a logical low level.

Figure 7:
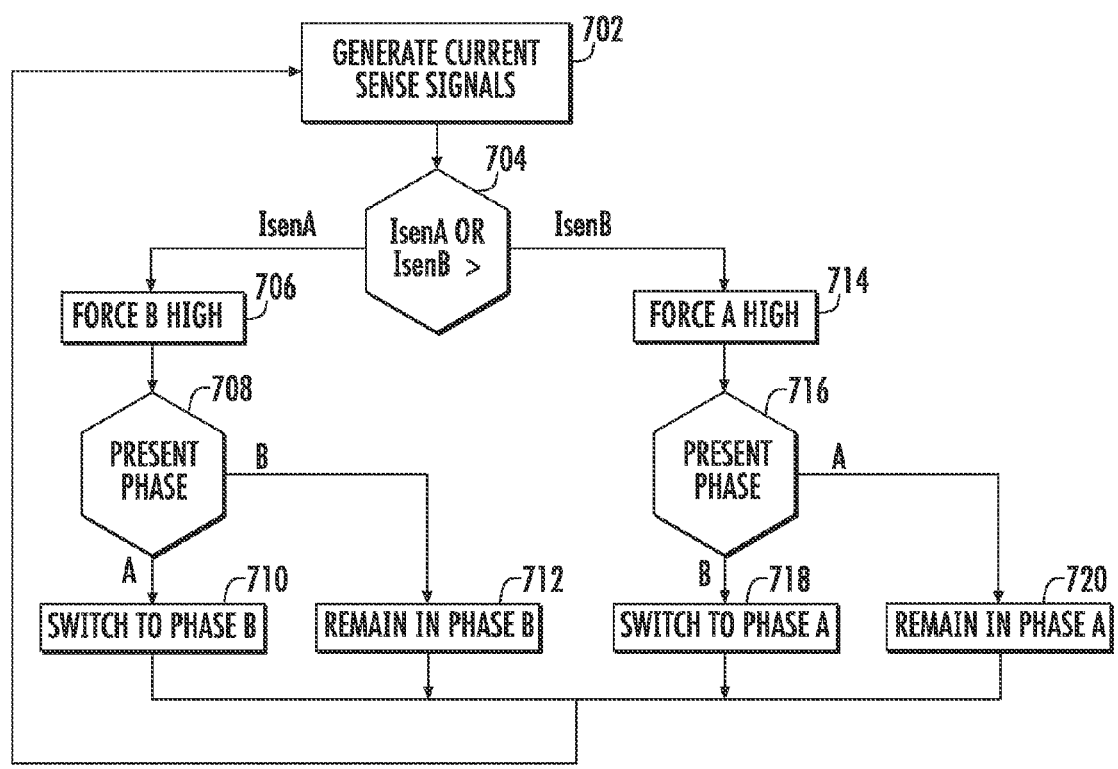
FIG. 7 is a flow diagram describing the operation of the phase swapping circuit of FIG. 6.

Referring now to FIG. 7, there is illustrated a flow diagram generally describing the operation of the circuitry of FIG. 6. Initially, at step 702 the current sense signals are generated by the current sources 603 and 605 responsive to the phase current in each of channels A and B. At inquiry step 704, the current comparison circuit 602 determines whether the $I_{SENA}$ or $I_{SENB}$ currents are greater. If the $I_{SENA}$ current is determined to be higher, the force B control signal is driven to a logical high level at 706 indicating that the phase B current should be turned on during the next clock cycle and the associated pulse from the PWM signal should be applied to the PWMB signal. Inquiry step 708 determines which phase is currently turned on by the phase controller circuitry. If phase A is currently on, the controller switches to phase B at step 710. If the controller is currently turning on phase B, control passes to step 712 and phase B remains turned on.

If inquiry step 704 determines that the ISENB signal is greater, control passes to step 714 to drive the force A control signal high. This provides an indication that the phase for channel A should be turned on during the next PWM pulse cycle. Inquiry step 716 determines the present active phase of the device, and if phase B is currently turned on, the controller switches to phase A at step 718. If phase A is currently determined to be active at inquiry step 716, phase A remains active at step 720 to further increase the phase A current to limit the differences between the phase A and phase B currents. From steps 710, 712, 718, and 720 control passes back to steps 702 to again generate the current sense signals and control the selected phase for the next PWM clock cycle.

Figure 8:
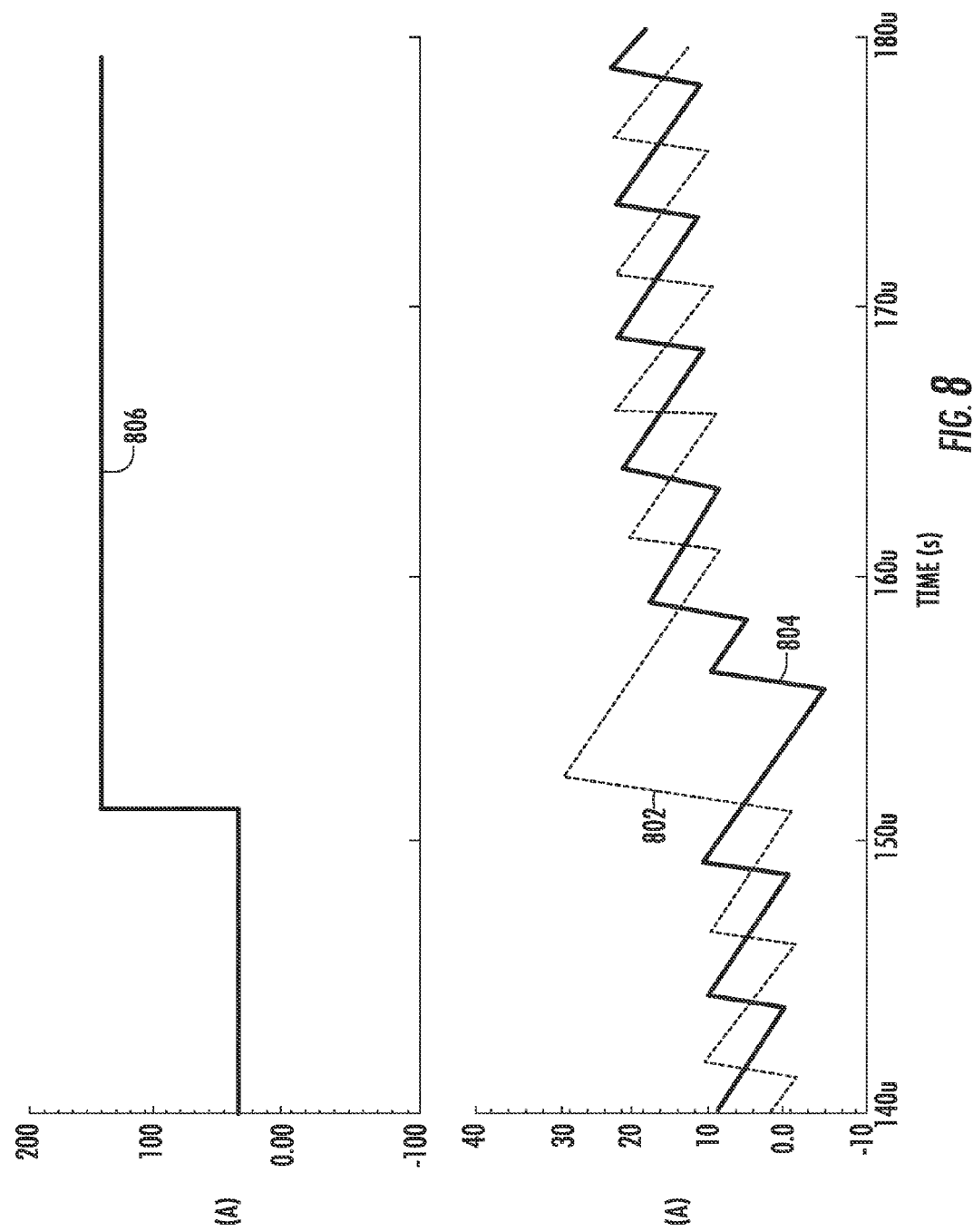
FIG. 8 illustrates simulation results of the operation of a phase doubler driver utilizing a phase swapping functionality.

Referring now to FIG. 8, there are illustrated the simulation results for a PWM controller including a swap functionality. Waveform 802 illustrates the phase A inductor current, while line 804 illustrates the phase B inductor current. When the system suddenly requires a higher output current as indicated by line 806, the phase A current 802 will fire for a longer period of time to provide the necessary current. However, when the phase B current 804 is supposed to fire, it does not receive quite as long a PWM pulse. Therefore, phase B will carry less current than phase A. The system will then swap the firing order and enable phase B to fire again to catch up with the difference to phase A. This results in a better current balance under load transients.

When current mismatch occurs within a phase doubling circuit, the two phases are not carrying equal currents, thus preventing the full benefits of multiphase regulation from being obtained. This can cause uneven thermal dissipation, and can damage switching transistors or load circuitries.

Figure 9:
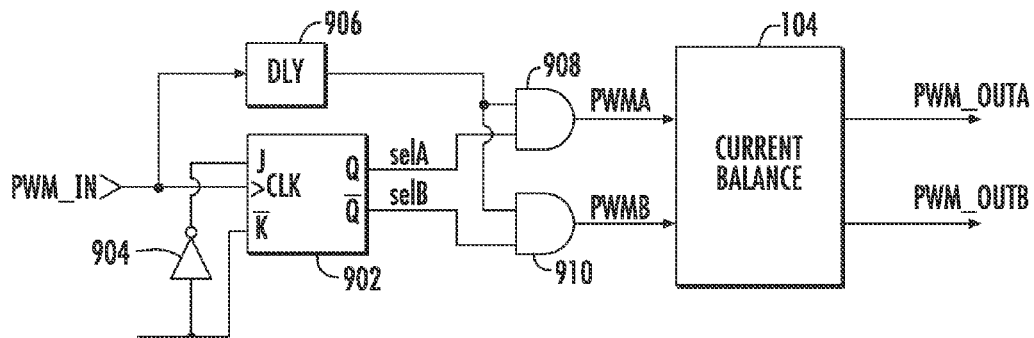
FIG. 9 is a block diagram of the circuitry for generating two PWM signals from a signal PWM input.

Referring now to FIG. 9, there is illustrated a block diagram of circuitry for providing two PWM output signals responsive to a single PWM input. The provided PWM signals are each in phase with each and are achieved by switching the PWM input between each of the phases A and B. When doing this, the output PWM frequency is one-half the PWM input frequency for each phase. This would be beneficial in situations wherein a balanced current situation exists without the load transient described previously. Using the PWM controller, the phase doubler driver disclosed with respect to FIG. 1 and external components, a voltage regulator's phase count may double. This enables circuit designers to increase the number of phases and systems that already use multiphase power solutions. By integrating current balancing, issues that may have arisen while driving multiple inductor channels using a single PWM output will be alleviated.

FIG. 9 is a block diagram of the control logic 102 and the current balance block 104 of FIG. 1. The output of the current balance block 104 is provided to the output drivers 112 of FIG. 1. The control logic portion 102 includes a JK flip-flop 902. An inverter 904 has its input connected to ground and its output connected to the J input of the JK flip-flop 902. The $\overline{K}$ output of the JK flip-flop 902 is also connected to ground. The CLK input of the JK flip-flop 902 is connected to receive the PWM input signal PWM_in. The PWM input signal is also provided to a delay circuit 906. The output of the delay circuit 906 is connected to one input of AND gate 908 and 910. The second input of AND gate 908 is connected to the Q output of JK flip-flop 902 to receive the SELA signal. The second input of AND gate 910 is connected to the $\overline{Q}$ input JK flip-flop 902 to receive the SELB signal. The output of the AND gate 908 comprises the PWMA signal and the output on the AND gate 910 comprises the PWMB signal that are each provided to the current balance block 104.

The outputs of the flip-flop 902 comprise opposite polarity digital signals. Thus, while SELA is at a logical high level, SELB is at a logical low level. Similarly, while the SELB is at a logical high level, SELA is at a logical low level. When a PWM rising edge is detected on the PWP_in signal, the state of the flip-flop 1302 toggles. This causes the select line of the phase that did not most recently fire to go to a logical high level. For instance, if phase A received the previous PWM pulse, a rising edge of the PWM input signal would toggle SELB to a logical high level causing phase B to receive the upcoming PWM pulse. This control logic could be implemented in any number of fashions, and the illustration of FIG. 9 comprises merely one variation thereof. The most relevant feature is that a single PWM pulse may be switched back and forth between multiple outputs.

Figure 10:
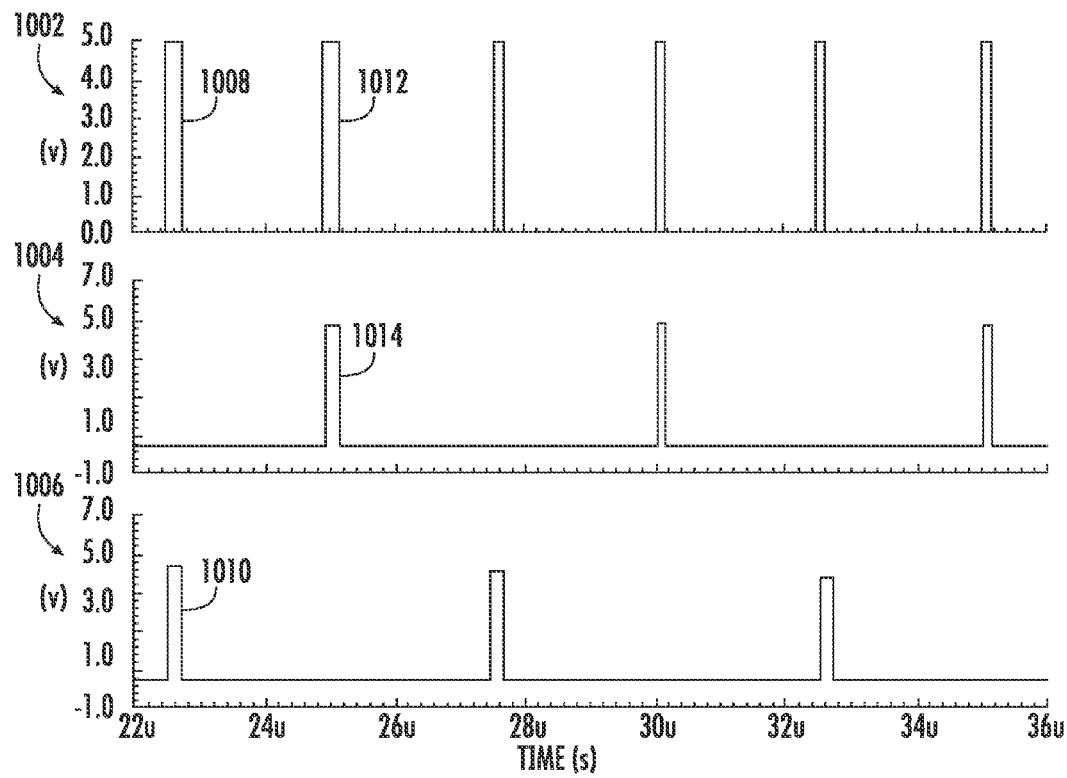
FIG. 10 illustrates a single PWM pulse being switched back and forth between two separate PWM outputs.

FIG. 10 provides an illustration of a PWM pulse 1002 being switched between phase A 1004 and phase B 1006. Pulse 1008 of the PWM signal 1002 is provided to phase B at 1010. The next pulse 1012 is provided to phase A 1004 at 1014. This process continues wherein the pulses are switched back and forth between phase B and phase A. However, merely switching the PWM input between multiple outputs is insufficient to create a phase doubling driver because of the propagation delay between the drivers and the other mismatches in the system that can create serious current mismatches. Additionally, since the main PWM controller only sees the average current of the two phases, it cannot determine if the current is imbalanced between the two PWM pulse strains generated from the original signal. Therefore, a current balancing scheme is required to handle current sharing between the pair of phases.

Figure 11:
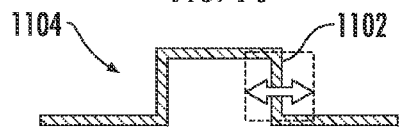
FIG. 11 illustrates a PWM pulse using falling edge modulation.

FIG. 11 illustrates a manner for balancing the current between a pair of phases by modulating the trailing edge of the PWM pulse. Mismatches between separate power trains can be corrected for by modulating the trailing edge 1102 of a PWM pulse 1 104. Although it would be impossible to shorten a PWM pulse without interrupting the voltage feedback, the pulse may be artificially shortened by adding an offset. In order to do this a fixed extension is added to each PWM pulse 1104. This will have a temporary effect on the output regulation voltage until the voltage loop corrects for it. Then, if the delay is removed, it effectively seems like the pulse has been shortened.

Figure 12:
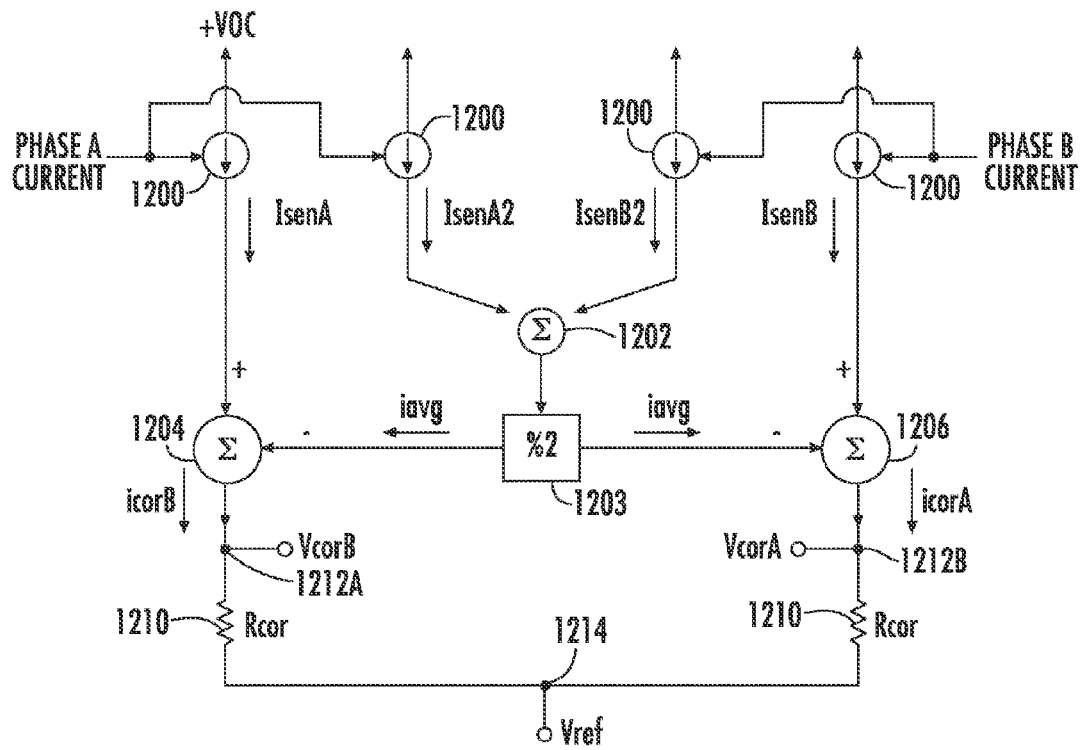
FIG. 12 illustrates a functional block diagram of the manner of operation of the current balance block of FIG. 9.

Referring now to FIG. 12, there is illustrated a functional block diagram of the current balance block 104 illustrated in FIG. 9. A pair of current sense amplifiers (not shown) generate a sensed current from each phase mode that is applied as an input phase A current and phase B current to a number of current sources 1200. Each current source is used to generate a sensed current responsive to each sensed phase current signal. Thus, currents $I_{SENA}$, $I_{SENA2}$, $I_{SENB2}$ and $I_{SENB}$ are generated from each of the current sources 1200. One copy of the sensed current $I_{SENA2}$ and $I_{SENB2}$ are summed together at 1202 and divided by 2 at 1203 to generate an average current $I_{AVG}$. The $I_{AVG}$ current is subtracted at summation node 1204 from the $I_{SENA}$ to generate a difference current $I_{CORB}$. Similarly, the average current $I_{AVG}$ is subtracted from the current $I_{SENB}$ at node 1206 to generate a difference current $I_{CORA}$. The difference current $I_{CORA}$ will be equal to and opposite in polarity from difference current $I_{CORB}$. Each of the difference currents $I_{CORB}$ and $I_{CORA}$ are forced across a resistor $R_{COR}$ 1210 connected between node 1212 and the Vref node 1214 to generate a correction voltage $V_{CORB}$ and a correction voltage $V_{CORA}$. If $I_{COR}$ is positive, the level of $V_{COR}$ is increased. If $I_{COR}$ is negative, the $V_{COR}$ is decreased.

Figure 13:
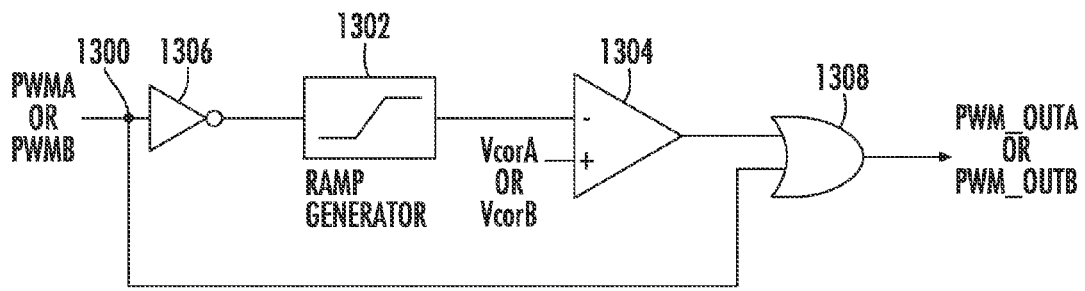
FIG. 13 is a functional block diagram of the falling edge modulation circuit.

Referring now to FIG. 13, there is illustrated a block diagram of the circuitry for generating the falling edge modulation described with respect to FIG. 11. The same circuitry would be used for each of channel A and channel B. A phase PWM signal PWMA or PWMB is applied at input node 1300 to the input of an inverter 1306 and an input of OR gate 1308. The output of inverter 1306 is connected to a ramp generator 1302. The ramp generator 1302 has an output connected to a inverting input of comparator 1304. The non-inverting input of comparator 1304 is connected to receive the $V_{CORA}$ or $V_{CORB}$ voltage correction signal depending upon whether channel A or channel B is being dealt with. The output of comparator 1304 is connected to the other input of OR gate 1308. The output of OR gate 1308 provides the PWM output signal for the A or B channel depending on which channel is being dealt with. When a rising edge occurs at the node 1300, the rising edge of the pulse immediately passes through to the output of the OR gate 1308. However, when the PWM signal at node 1300 goes low, the failing edge of the PWM signal initiates the fixed speed up-ramp generator 1302. The outgoing PWM signal will not go low until the ramp voltage is higher than the $V_{COR}$ voltage as determined by the comparator 1304. Thus, if $V_{CORB}$ is higher than $V_{CORA}$, the PWM pulse for phase B will be longer than the PWM pulse for phase A.

Figure 14:
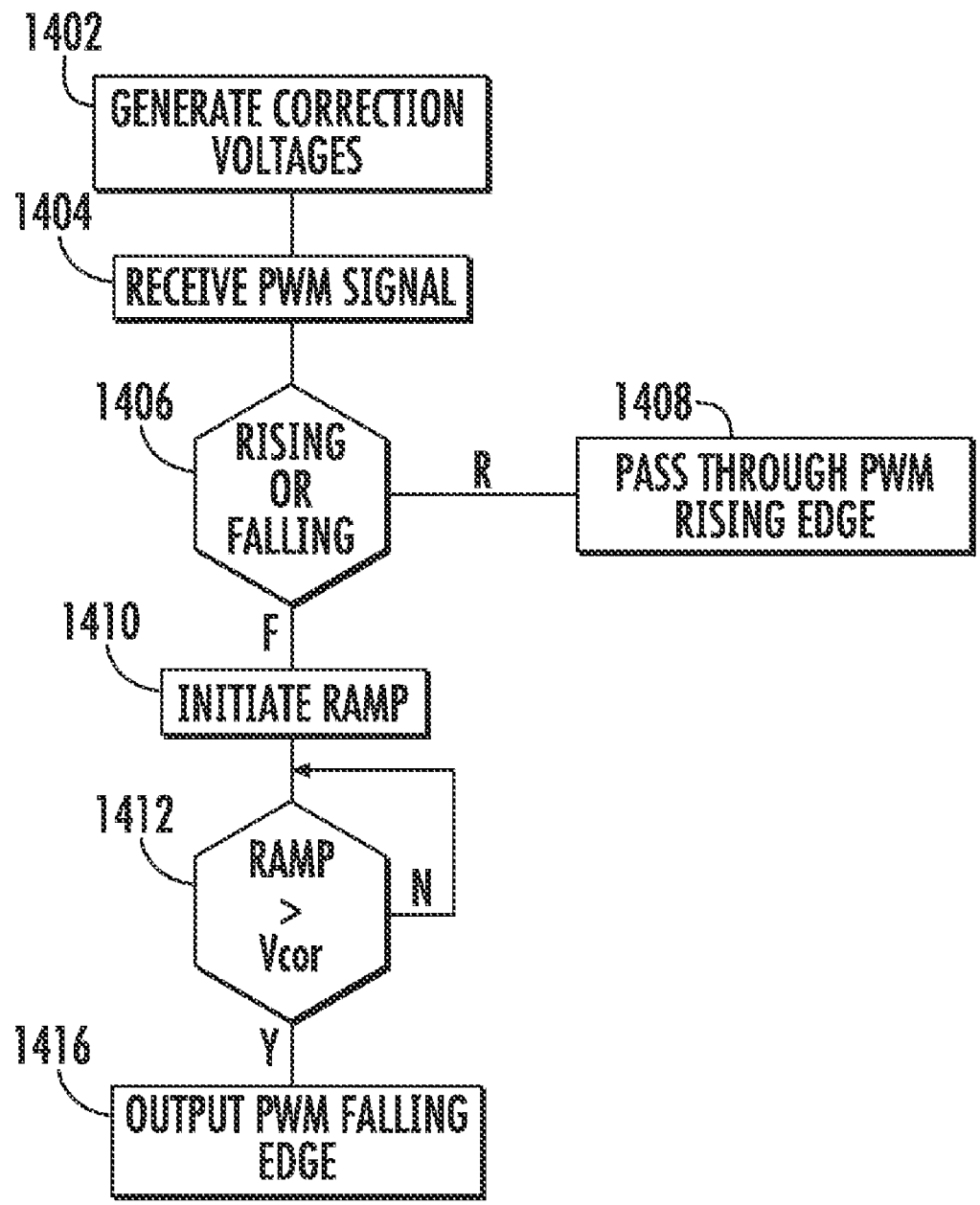
FIG. 14 is a flow diagram describing the operation of the falling edge modulation circuit.

Referring now to FIG. 14, there is illustrated a flow diagram describing the manner in which the falling edge modulation is implemented. At step 1402, the correction voltage $V_{COR}$ is generated in accordance with the manner described previously with respect to FIG. 12. The PWM signal is received at step 1404 and inquiry step 1406 determines whether a rising edge or a falling edge of the PWM signal has been received. If a rising edge of the PWM signal is received, this is automatically passed through at step 1408. This is due to the fact that modulation is only occurring with the falling edge of the signal as described with respect to FIG. 11 and not with respect to the leading edge. If inquiry step 1406 determines that a falling edge of the PWM signal has been received, the ramp generator is initiated at step 1402 to generate the ramp signal. Inquiry step 1412 determines whether the ramp voltage generated by the ramp generator 1302 exceeds the correction voltage $V_{COR}$. If not, control loops back to step 1412 to continue to compare the ramp voltage and the correction voltage. Once the ramp voltage is determined to be greater than the correction voltage, the falling edge of the PWM signal is output at step 1416. This will provide a delay on the falling edge of the output PWM signal equal to the time it takes the ramp voltage to exceed the correction voltage.

Figure 15:
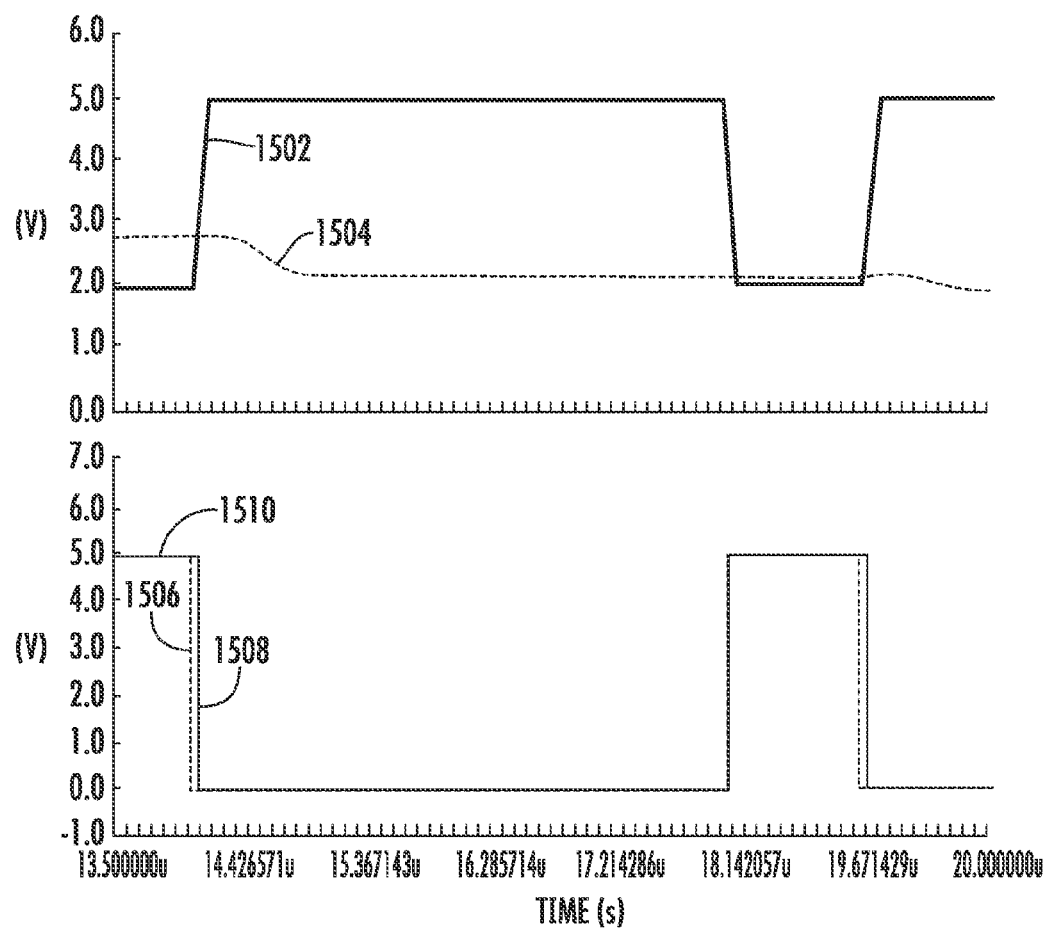
FIG. 15 illustrates simulation results for a circuit using falling edge modulation.

FIG. 15 illustrates simulation results for circuitry using the PWM falling edge modulation extension as described hereinabove. The waveform 1502 comprises the ramp generator output and waveform 1504 comprises the $V_{COR}$ voltage. On the bottom half of the attached graph are the PWM input and output signals. Waveform 1506 is the original signal and waveform 1508 is the PWM output that has been extended by an amount 1510 using the described current balancing scheme.

Figure 16:
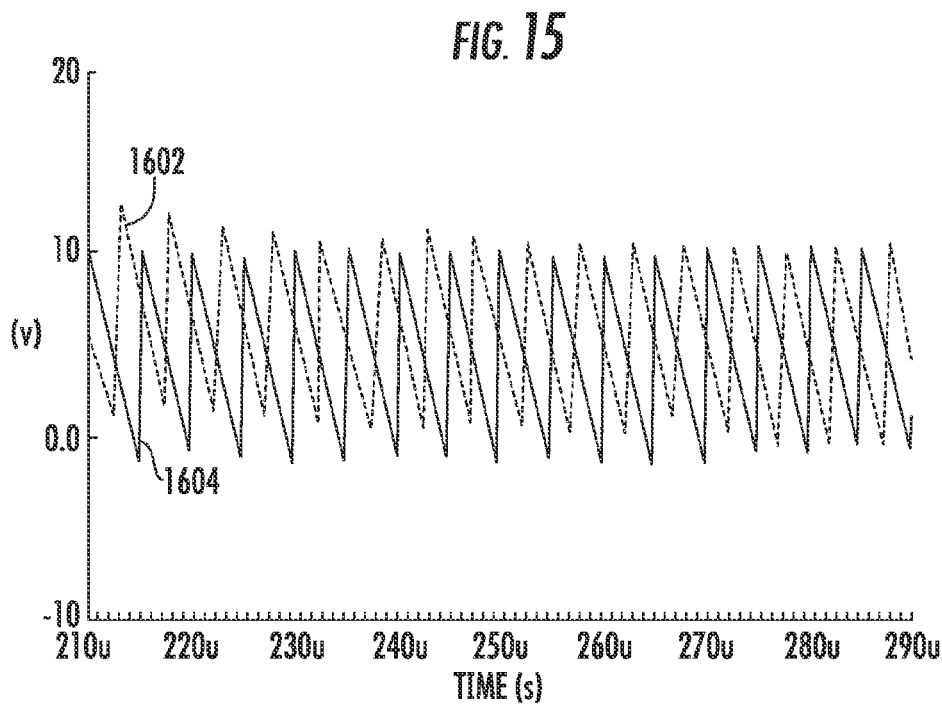
FIG. 16 illustrates a pair of phase currents being driven toward balance.

FIG. 16 illustrates a simulation result showing that the current balance scheme will help balance the pair of phases that are being driven by a single PWM signal. Initially, the phases are not in balance with the phase 1602 moving down and the phase 1604 moving up slowly. Toward the end of the graph, the imbalance between the signals has been removed and both phases are running with equal current. Using the described system, two current balanced PWM channels can be generated from a single PWM signal. This will enable customers to easily retrofit their existing systems to handle higher load currents or provide higher efficiency at heavy load with minimum board redesign.

It will be appreciated by those skilled in the art having the benefit of this disclosure that this phase doubler provides an ability to handle higher load currents. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A phase doubler driver circuit, comprising:
   a first input for receiving an input PWM drive signal;
   first control logic for generating a first output PWM drive signal and a second output PWM drive signal responsive to the input PWM drive signal;
   wherein in a first mode of operation alternating pulses of the input PWM drive signal are output as the first output PWM drive signal and the second PWM output drive signal respectively;
   wherein in a second mode of operation the input PWM drive signal is provided as the first output PWM drive signal when a second phase current associated with the second output PWM drive signal exceeds a first phase current associated with the first output PWM drive signal and the input PWM drive signal is provided as the second output PWM drive signal when the phase current associated with the first output PWM drive signal exceeds the phase current associated with the second output PWM drive signal;
   second control logic for adding an offset to a falling edge of the first output PWM drive signal responsive to a difference between a first current associated with the first phase current and an average current and for adding the offset to a falling edge of the second output PWM drive signal responsive to a difference between a second current associated with the second phase current and the average current, wherein the average current comprises the average of the first current and the second current; and drive circuitry for generating drive signals responsive to each of the first output PWM drive signal and the second output PWM drive signal.

2. The phase doubler driver circuit of claim 1, wherein the first control logic further comprises a comparator for determining a larger of the first phase current and the second phase current and generating control signals indicating whether the first phase current or the second phase current is larger.

3. The phase doubler driver circuit of claim 2, wherein the first control logic further comprises:
    selection logic responsive to the control signals of the comparator for selecting the first mode of operation or the second mode of operation; and
    a latch for latching PWM control signals into the first mode of operation or the second mode of operation.

4. The phase doubler driver circuit of claim 2, further including sensing circuitry for generating a first sensing current responsive to the first phase current and a second sensing current responsive to the second phase current.

5. The phase doubler driver circuit of claim 1, wherein the second control logic further comprises:
    sensing circuitry for generating a sensing current associated with each of the first phase current and the second phase current;
    averaging circuitry for determining an average of the sensing currents associated with each of the first phase current and the second phase current; and
    summation circuitry for subtracting the average of the sensing currents from each of the sense currents associated with the first phase current and the second phase current to generate correction signals associated with the first phase current and the second phase current.

6. The phase doubler driver circuit of claim 5, wherein the second control logic further comprises:
    a ramp circuit for generating a ramp voltage responsive to a falling edge of the input PWM drive signal;
    a comparator for comparing the ramp voltage with the correction signal associated with one of the first phase current and the second phase current and generating a control output when the ramp voltage exceeds the correction signal; and
    gate logic for outputting a leading edge of the input PWM drive signal when it is received and delaying output of the trailing edge of the input PWM drive signal responsive to the control output.

7. The phase doubler driver circuit of claim 5, wherein the second control logic further comprises:
    a ramp circuit for generating a ramp voltage responsive to a falling edge of the input PWM drive signal;
    a comparator for comparing the ramp voltage with the correction signal associated with one of the first phase current and the second phase current and generating a control output when the ramp voltage exceeds the correction signal; and
    gate logic for outputting a leading edge of the input PWM drive signal when it is received and delaying output of the trailing edge of the PWM input drive signal responsive to the control output.

8. The phase doubler driver circuit of claim 1, wherein the second control logic further comprises:
    sensing circuitry for generating a sensing current associated with each of the first phase current and the second phase current;
    averaging circuitry for determining an average of the sensing currents associated with each of the first phase current and the second phase current; and
    summation circuitry for subtracting the average of the sensing currents from each of the sense currents associated with the first phase current and the second phase current to generate correction signals associated with the first phase current and the second phase current.

9. A phase doubler driver circuit, comprising:
    a first input for receiving an input PWM drive signal;
    first control logic for generating a first output PWM drive signal and a second output PWM drive signal responsive to the input PWM drive signal;
    wherein in a first mode of operation alternating pulses of the input PWM drive signal are output as the first output PWM drive signal and the second PWM output drive signal respectively;
    wherein in a second mode of operation the input PWM drive signal is provided as the first output PWM drive signal when a second phase current associated with the second output PWM drive signal exceeds a first phase current associated with the first output PWM drive signal and the input PWM drive signal is provided as the second output PWM drive signal when the phase current associated with the first output PWM drive signal exceeds the phase current associated with the second output PWM drive signal; and
    drive circuitry for generating drive signals responsive to each of the first output PWM drive signal and the second output PWM drive signal.

10. The phase doubler driver circuit of claim 9, wherein the first control logic further comprises a comparator for determining a larger of the first phase current and the second phase current and generating control signals indicating whether the first phase current or the second phase current is larger.

11. The phase doubler driver circuit of claim 10, wherein the first control logic further comprises:
    selection logic responsive to the control signals of the comparator for selecting the first mode of operation or the second mode of operation; and
    a latch for latching PWM control signals into the first mode of operation or the second mode of operation.

12. The phase doubler driver circuit of claim 10, further including sensing circuitry for generating a first sensing current responsive to the first phase current and a second sensing current responsive to the second phase current.

13. A phase doubler driver circuit, comprising:
    a first input for receiving an input PWM drive signal;
    first control logic for generating a first output PWM drive signal and a second output PWM drive signal responsive to the input PWM drive signal;
    wherein in a first mode of operation alternating pulses of the input PWM drive signal are output as the first output PWM drive signal and the second PWM output drive signal respectively;
    second control logic for adding an offset to a falling edge of the first output PWM drive signal responsive to a difference between a first current associated with the first phase current and an average current and for adding the offset to a falling edge of the second output PWM drive signal responsive to a difference between a second current associated with the second phase current and the average current, wherein the average current comprises the average of the first current and the second current; and drive circuitry for generating drive signals responsive to each of the first output PWM drive signal and the second output PWM drive signal.

14. A method for generating multiple phase PWM signals from a single input PWM drive signal, comprising the steps of:
receiving the input PWM drive signal;
generating a first output PWM drive signal and a second output PWM drive signal in a first mode of operation, wherein alternating pulses of the input PWM drive are output as the first output PWM drive signal and the second PWM output drive signal respectively responsive to the input PWM drive signal;
generating the first output PWM drive signal and the second PWM output drive signal in a second mode of operation, wherein the input PWM drive signal is provided as the first output PWM drive signal when a second phase current associated with the second output PWM drive signal exceeds a first phase current associated with the first output PWM drive signal and the input PWM drive signal is provided as the second output PWM drive signal when the phase current associated with the first output PWM drive signal exceeds the phase current associated with the second output PWM drive signal;
adding an offset to a falling edge of the first output PWM drive signal responsive to a difference between a first current associated with the first phase current and an average current;
adding the offset to a falling edge of the second output PWM drive signal responsive to a difference between a second current associated with the second phase current and the average current, wherein the average current comprises the average of the first current and the second current; and
generating drive signals responsive to each of the first output PWM drive signal and the second output PWM drive signal.

15. The method of claim 14, wherein the step of generating in the second mode further comprises the steps of determining a larger of the first phase current and the second phase current and generating control signals indicating whether the first phase current or the second phase current is larger.

16. The method of claim 15, wherein the step of generating in the second mode further comprises the steps of:
selecting the first mode of operation or the second mode of operation responsive to the control signals;
latching PWM control signals into the first mode of operation or the second mode of operation.

17. The method of claim 15, further including the step of generating a first sensing current responsive to the first phase current and a second sensing current responsive to the second phase current.

18. The method of claim 14, wherein the steps of adding an offset further comprise the steps of:
generating a sensing current associated with each of the first phase current and the second phase current;
determining an average of the sensing currents associated with each of the first phase current and the second phase current;
subtracting the average of the sensing currents from each of the sense currents associated with the first phase current and the second phase current to generate correction signals associated with the first phase current and the second phase current.

19. The method of claim 18, wherein the steps of adding an offset further comprises the steps of:
generating a ramp voltage responsive to a falling edge of the PWM input drive signal;
comparing the ramp voltage with the correction signal associated with one of the first phase current and the second phase current;
generating a control output when the ramp voltage exceeds the correction signal;
outputting a leading edge of the input PWM drive signal when it is received; and
delaying output of the trailing edge of the input PWM drive signal responsive to the control output.

* * * * *